United States Patent [19]

Rodenberg et al.

[11] Patent Number: 4,934,505
[45] Date of Patent: Jun. 19, 1990

[54] CONVEYOR BELT BOOM FOR LARGE-SCALE CONVEYING EQUIPMENT

[75] Inventors: Joachim Rodenberg, Stockelsdorf; Sükrü Ceyland, Lübeck, both of Fed. Rep. of Germany

[73] Assignee: O&K Orenstein & Koppel Aktiengesellschaft, Dortmund, Fed. Rep. of Germany

[21] Appl. No.: 281,618

[22] Filed: Dec. 8, 1988

[30] Foreign Application Priority Data

Dec. 11, 1987 [DE] Fed. Rep. of Germany ..... 37420097

[51] Int. Cl.⁵ .............................................. B65G 21/10
[52] U.S. Cl. ................................. 198/314; 198/861.2
[58] Field of Search ...................... 198/314, 861.2, 588, 198/594

[56] References Cited

U.S. PATENT DOCUMENTS

| | | | |
|---|---|---|---|
| 2,795,315 | 6/1957 | Hahir et al. | 198/861.2 X |
| 3,828,913 | 8/1974 | Scholler | 198/307.1 |
| 3,841,463 | 10/1974 | Stone et al. | 198/861.2 |
| 4,730,716 | 3/1988 | Enneking et al. | 198/861.2 X |
| 4,775,047 | 10/1988 | Grall | 198/861.2 |

FOREIGN PATENT DOCUMENTS

| | | |
|---|---|---|
| 1936304 | 1/1971 | Fed. Rep. of Germany . |
| 2757409 | 6/1978 | Fed. Rep. of Germany ... 198/861.2 |
| 3532182 | 3/1987 | Fed. Rep. of Germany ... 198/861.2 |

OTHER PUBLICATIONS

Dahlitz et al., "Weiterentwicklung von Geräten für den Direktversturz", Hebezeuge und Fördermittel, 1987, pp. 104–107.

*Primary Examiner*—David A. Bucci
*Assistant Examiner*—Cheryl L. Gastineau
*Attorney, Agent, or Firm*—Spencer & Frank

[57] ABSTRACT

A conveyor boom which is mounted to the superstructure of a large-scale conveyor so as to be raised and lowered in a vertical plane, such as a belt boom for a stacker, a discharge belt boom for a bucket wheel excavator or the like in which sets of carrier rollers are mounted on both sides of the hinge point of the discharge belt carrier in a plurality of hinged together carrier roller frame members and, at their articulated connections, are provided with supporting rollers which are supported on the running faces of supporting carrier members mounted below the discharge belt.

4 Claims, 2 Drawing Sheets

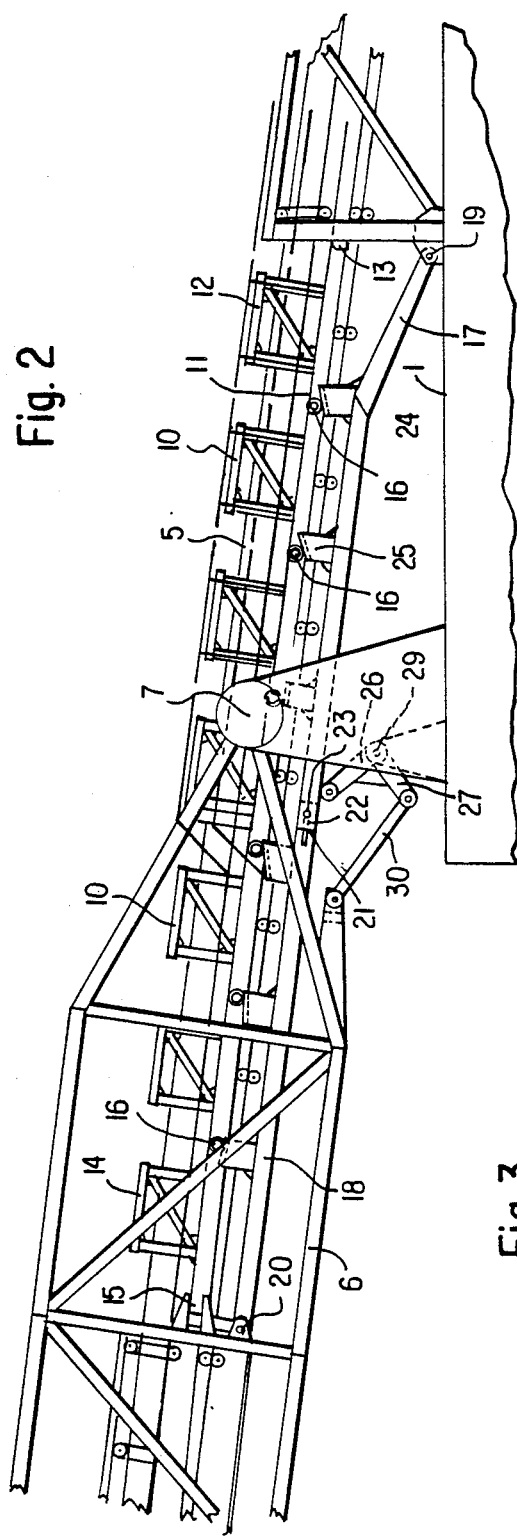
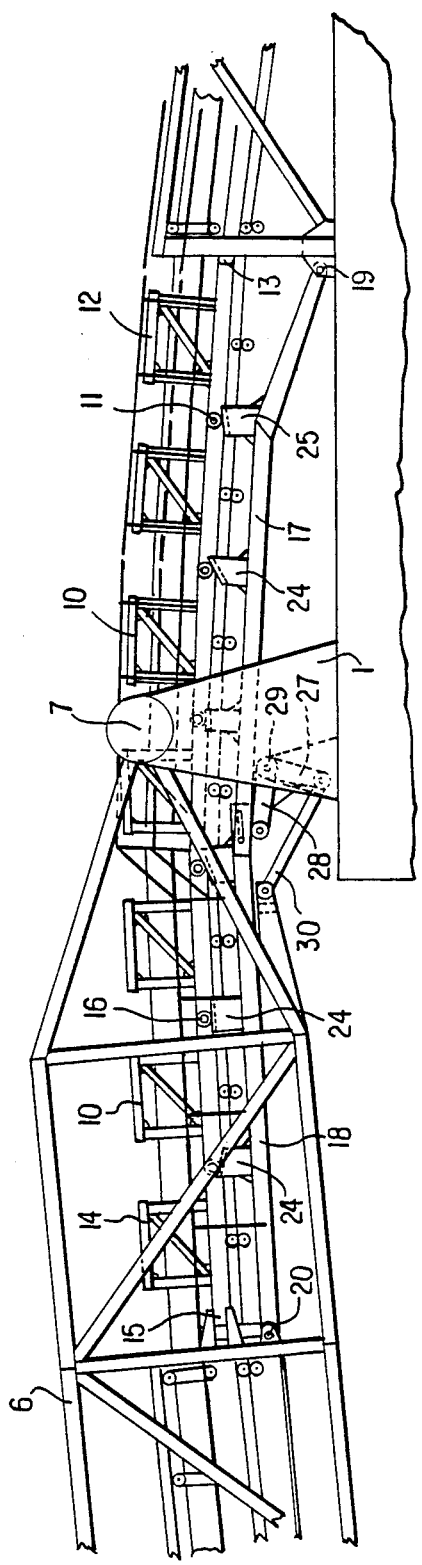
Fig. 2
Fig. 3

CONVEYOR BELT BOOM FOR LARGE-SCALE CONVEYING EQUIPMENT

BACKGROUND OF THE INVENTION

The present invention relates to a conveyor boom which is mounted to the superstructure of a large-scale conveyor so as to be raised and lowered in a vertical plane, such as a belt boom for a stacker, a discharge belt boom for a bucket wheel excavator or the like.

Bucket wheel excavators are known which are equipped with a discharge belt which is pivotally mounted in the superstructure of the bucket wheel excavator so as to be pivotal as well as raisable and lowerable for adjustment of its height. It is also known to suspend the rear end of the discharge belt boom from the superstructure so that it can be raised and lowered in an articulated manner about a horizontal axis in order to permit the discharge belt to be guided at different slopes. Such a device is disclosed in DE-GM 7229102 which is the priority application of U.S. Pat. No. 3,828,913. In such a type of mounting of the discharge belt boom, the conveyor belt is stressed differently at the point of articulation depending on the setting of the discharge belt boom. If the downward angle is excessive, the upper reach of the conveyor belt is stretched and the lower reach is compressed. On the other hand, if the discharge belt boom is pivoted upwardly, the reverse stretching and compression stresses occur at the conveyor belt.

The periodical "Hebezeuge und Föeller rdermittel" [Lifting and Conveying Equipment], Berlin 27, 1987, page 104 et seq. describes direct drop stackers in which a discharge belt is also mounted at a superstructure so as to be raised and lowered. The stresses on the conveyor belt at the point where the discharge belt boom is attached vary depending on whether the discharge belt boom is pivoted upwardly or downwardly. The different stresses on the conveyor belt at the point of its sharp bend may lead to operational malfunctions. Also, wear of the discharge belt is increased.

SUMMARY OF THE INVENTION

It is an object of the present invention to avoid these drawbacks and to provide a bearing for the discharge conveyor belt boom such that excessively sharp bends in the conveyor belt at the point of its bearing are avoided. The belt tension is to be kept as constant as possible also at the point of transition. In other words, at the point of transition the conveyor belt is not to be subjected to great curvatures. That means that sharp bends are to be avoided where the conveyor belt describes a convex curve and where it describes a concave curve, lifting of the conveyor belt is to be avoided without the use of additional guide means such as stirrups, catch rollers or the like.

The present invention solves the above problem by providing a conveyor including a superstructure, a discharge belt mounted in the superstructure and a hinged discharge belt carrier mounted on the superstructure for supporting the discharge belt, the discharge belt carrier being movable in a vertical plane, Carrier roller frame members are mounted in the discharge belt carrier and are hinged to one another at hinged connections. At least one of the carrier roller frame members is articulately mounted to the superstructure. Supporting rollers are attached to the frame members at the hinge connections and are supported on the running faces of supporting carrier members mounted below the discharge belt. At least one the roller support member is guided in the discharge belt carrier so as to be longitudinally displaceable.

More particularly, the invention resides in a conveyor boom which is mounted to the superstructure of a large-scale conveyor so as to be raised and lowered in a vertical plane, such as a belt boom for a stacker, a discharge belt boom for a bucket wheel excavator or the like, wherein the sets of supporting rollers on both sides of the hinge point of the discharge belt carrier are mounted in a plurality of carrier roller frame members which are hinged to one another, with the first carrier roller frame member, when seen in the direction of conveyance, being articulatedly mounted to the superstructure of the device and the hinged-together carrier roller frame members are equipped with supporting rollers at their hinge connections, these supporting rollers being supported on the running faces of supporting carrier members which are mounted below the discharge belt and at least the last one of the carrier roller support members is guided in the discharge belt carrier so as to be longitudinally displaceable.

BRIEF DESCRIPTION OF THE DRAWINGS

One embodiment of the invention will be described below with reference to its schematic illustration in the drawing figures.

FIG. 2 shows, to an enlarged scale, the configuration of the bearing of the conveyor belt boom in the region of its articulation to the superstructure, with the discharge conveyor belt boom being pivoted up.

FIG. 3 shows the same equipment with the discharge belt boom in the lowered end position.

DETAILED DESCRIPTION OF THE PREFERRED EMBODIMENT

Figure 1:
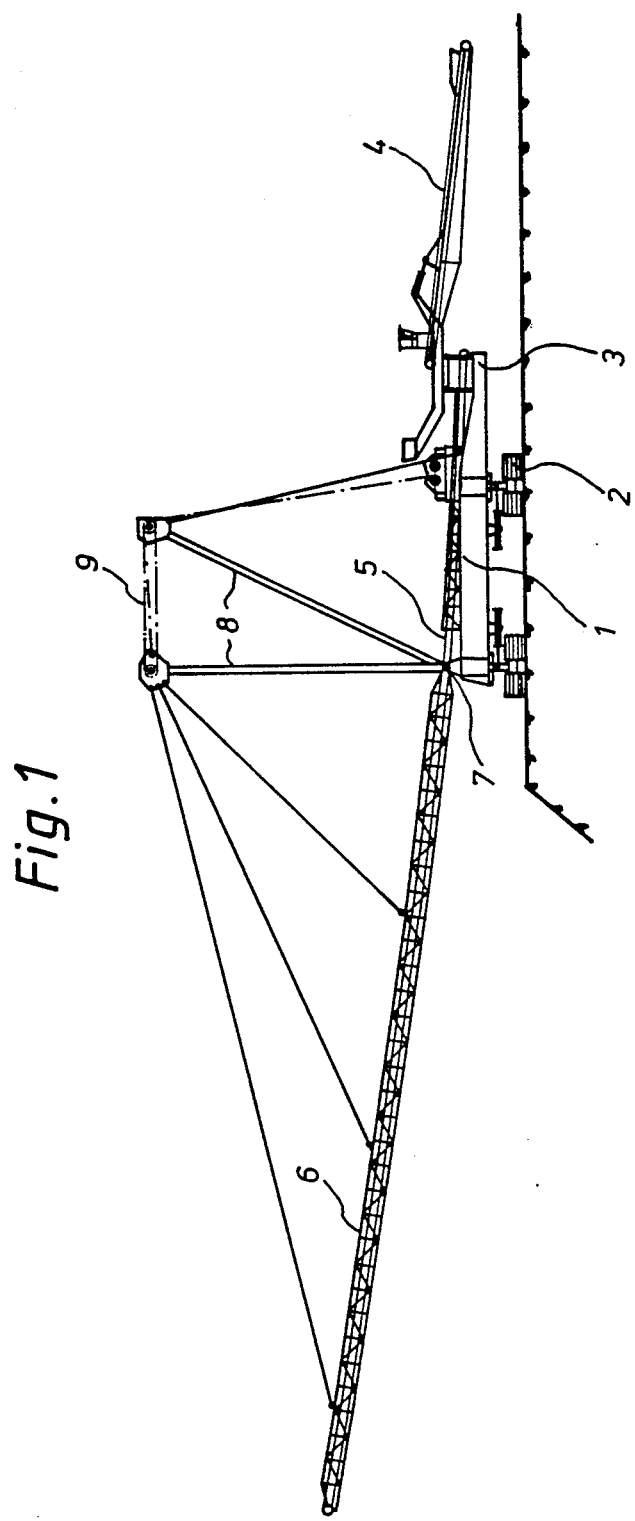
FIG. 1 is an overview of a direct drop stacker seen from the side.

The belt stacker shown in FIG. 1 is composed of a superstructure 1 which is movable on a track-laying carriage 2. A pivotal intake belt carrier 4 is mounted at the cantilever arm 3 of superstructure 1 so as to be raisable and lowerable. The conveyor belt of intake belt carrier 4 takes over the material to be conveyed from connected equipment and transfers it to the discharge belt 5 mounted in superstructure 1. This discharge belt is supported by discharge belt carrier 6 which is mounted at superstructure 1 so as to be raisable and lowerable about the horizontal axis of its point of articulation 7. Cable supports 8 which are connected with one another by way of cable guides 9 serve to guy discharge belt carrier 6.

As seen in FIGS. 2 and 3, to guide discharge belt 5 in the region of point of articulation 7, a special structure is provided which, on the one hand, is composed of a plurality of support roller carrier members 10 arranged one behind the other. In the illustrated embodiment, seven support roller carrier members 10 are provided which are connected with one another by way of hinge connections 11. Seen in the conveying direction, the first support roller carrier member 12 is fastened to superstructure 1 at hinge point 13.

The last support roller carrier member 14, seen in the conveying direction, is mounted in a slide guide 15 so as to be longitudinally movable at discharge belt carrier 6.

At their hinge connections 11, the individual support roller carrier members 10 are each provided with support rollers 16 which are mounted on a supporting carrier. The latter is made of two members 17 and 18, with the rear supporting carrier member 17 being articulated to superstructure 1 at bearing point 19, while the other supporting carrier member 18 is mounted at discharge belt carrier 6 at bearing location 20. In their center portions, both supporting carrier members 17 and 18 are connected with one another by way of a slide guide 21. In the illustrated embodiment, slide guide 21 in the rear supporting carrier member 18 is composed of a slide slot 22 and in the front supporting carrier member 17 of a slide pin 23. These supporting carrier members 17 and 18 are provided with a plurality of supporting blocks 24 lying in the region of support rollers 16. The running faces 25 for these supporting rollers 16 are given different slopes so that supporting roller carrier members 10 take on different inclined positions when discharge belt carrier 6 is raised and lowered, thus resulting in a uniform curvature of the conveyor belt over the entire path of supporting roller carrier members 10. In this way, the conveyor belt is given a uniform curvature at all discharge belt height settings, realizing radii of curvature of 80 m without difficulty.

In the illustrated embodiment of the invention, supporting carrier members 17 and 18 are additionally supported by a supporting block 26 which is configured as a double lever 27, 28 and is mounted at superstructure 1 so as to pivot about a horizontal axis 29. By way of the lower double lever 27, both sides of a pull rod 30 are hinged to discharge belt carrier 6.

It will be understood that the above description of the present invention is susceptible to various modifications, changes and adaptations, and the same are intended to be comprehended within the meaning and range of equivalents of the appended claims.

What is claimed is:

1. A conveyor comprising:
   a superstructure;
   a discharge belt;
   a hinged discharge belt carrier mounted on said superstructure for carrying said discharge belt, said discharge belt carrier being pivotable in a vertical plane;
   a plurality of carrier roller frame members extending into said discharge belt carrier, said roller frame members being hinged to one another at hinged connections, wherein at least one said frame member is mounted on said discharge belt carrier so as to be longitudinally displaceable and a second frame member is pivotably attached to said superstructure;
   supporting rollers attached to said frame members at said hinge connections;
   a supporting carrier pivotably attached to said superstructure below said discharge belt;
   supporting blocks mounted on said supporting carrier, said supporting blocks including running faces for supporting said supporting rollers.

2. The conveyor according to claim 1, wherein said running faces of said supporting blocks have different slopes in a conveying direction.

3. The conveyor according to claim 1, wherein said supporting carrier comprises:
   a rear supporting carrier member hinged to said superstructure; and
   a front supporting carrier member having a front end hinged to said discharge belt carrier, wherein both said supporting carrier members are connected with one another so as to be longitudinally movable and include a longitudinally movable connection lying in a region near where said discharge belt carrier is hinged.

4. The conveyor according to claim 3, wherein at least one of said two supporting carrier members is supported by a supporting means which is mounted on said superstructure and is connected to said discharge belt carrier by means of a pull rod, said pull rod being hinged to said discharge belt carrier.

* * * * *